Patented Feb. 21, 1933

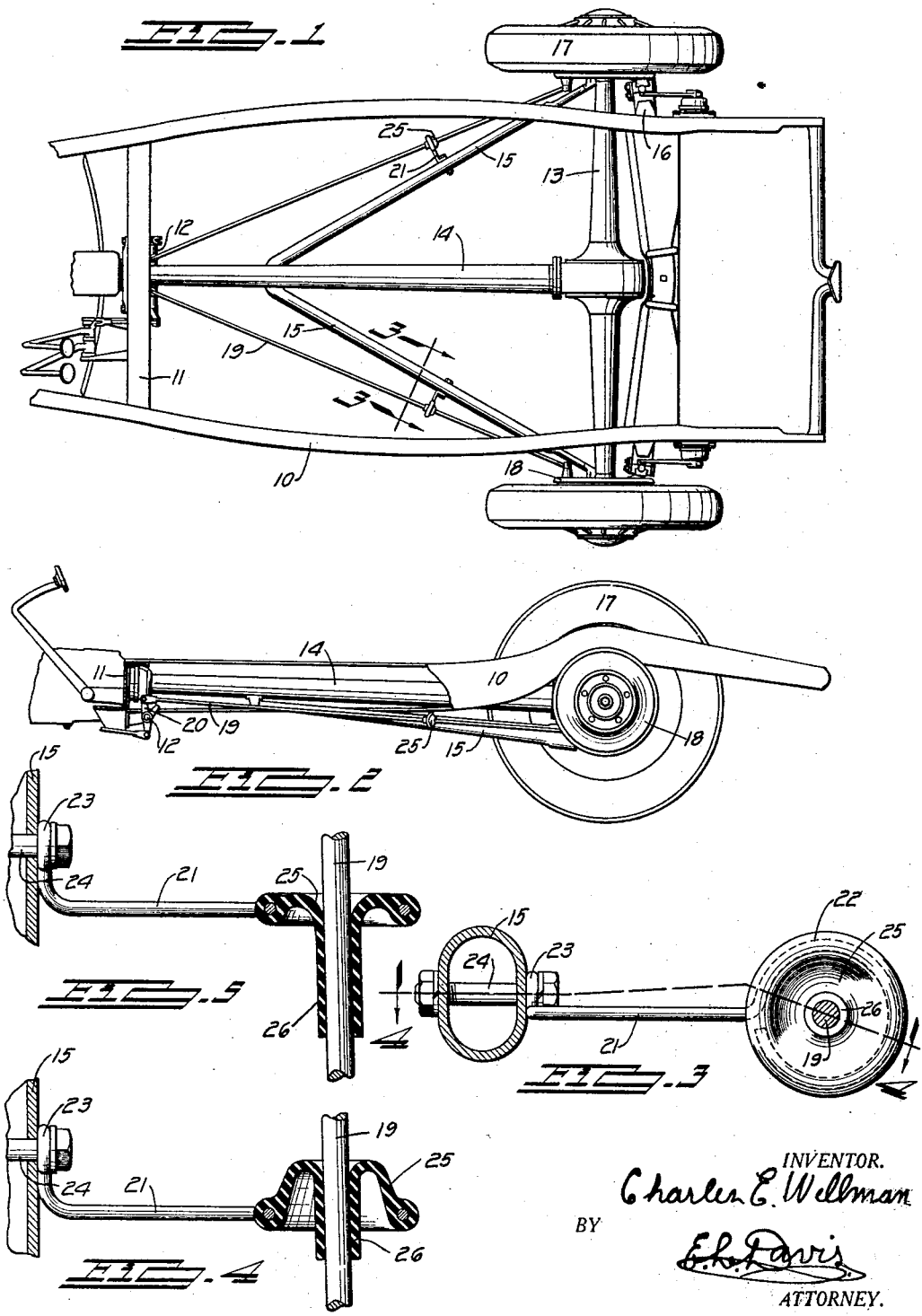

1,898,699

UNITED STATES PATENT OFFICE

CHARLES E. WELLMAN, OF DEARBORN, MICHIGAN, ASSIGNOR TO FORD MOTOR COMPANY, OF DEARBORN, MICHIGAN, A CORPORATION OF DELAWARE

BRAKE ROD SUPPORTING MEANS

Application filed May 27, 1932. Serial No. 613,985.

An object of my invention is to provide a brake rod supporting means especially adapted to support the intermediate portions of automotive vehicle brake rods whereby rattling of the rods will be eliminated. Heretofore, it has been conventional practice in designing automobiles which are equipped with mechanically operated brakes to provide a central transverse brake operating shaft and to connect the ends of this shaft with the brakes on each wheel by means of longitudinally extending tension rods. This invention provides a relatively inexpensive and simple means for resiliently supporting the intermediate portions of these rods so as to permit longitudinal movement thereof while at the same time preventing rattle between the rod and the support.

Still a further object of this invention is to provide a support of the class described which will resiliently urge the brake operating rod to its released position to thereby assist in maintaining a clearance between the brake shoes and brake drums when the brake pedal is not being applied.

With these and other objects in view, my invention consists in the arrangement, construction and combination of the various parts of my improved device, as described in the specification, claimed in my claims and illustrated in the accompanying drawing, in which:

Figure 1 shows a plan view of the rear portion of an automobile chassis having my improved brake rod supports mounted thereon.

Figure 2 shows a side view of that portion of the chassis shown in Figure 1, one rear wheel being removed and part of the chassis frame being broken away to better illustrate the construction.

Figure 3 shows a sectional view, taken on the line 3—3 of Figure 1.

Figure 4 shows a sectional view, taken on the line 4—4 of Figure 3, illustrating the normal position of the brake rod support, which is that position assumed by the device when the brake is released, and Figure 5 shows a sectional view, similar to the view shown in Figure 4, illustrating the deflection occurring in the resilient portion of the brake support when the brake is being applied.

Referring to the accompanying drawing, I have used the reference numeral 10 to indicate generally a chassis frame having a center cross member 11 upon which a transverse brake operating shaft 12 is rotatably mounted. A rear axle 13 together with torque tube 14 and a pair of radius rods 15 form a part of the vehicle chassis, the rear end of the frame 10 being supported on the axle by means of a transverse spring 16. Suitable wheels 17 are driven at the outer ends of the axle 13, each of which wheels is provided with a brake mechanism 18 and each of which brakes is operable by a tension rod 19 which extends from the particular brake forwardly to a suitable lever 20 formed on the adjacent end of the brake operating shaft 12. It will be noted that the shaft 12 is considerably shorter than the axle 13 so that the rods 19 extend substantially parallel to the radius rods 15. Inasmuch as the forward end of the torque tube is pivotally secured to the center cross member adjacent to the cross shaft 12, it is apparent that upon movement of the axle relative to the frame, the rods 19 and adjacent radius rods will move more or less together.

The rods 19 are tension rods and are economically constructed, having a small diameter so that during the normal operation of the vehicle these rods have a tendency to whip and it is to prevent this whipping action by means of novel supports at the intermediate points on the rods that forms the basis of this invention.

In order to accomplish this purpose, I have provided a bracket which is detachably secured to each radius rod 15 and which extends outwardly therefrom and in which the intermediate portion of the adjacent brake rod 19 is resiliently secured. This bracket consists of a wire 21 having one end thereof bent around to form a relatively large eye, as shown by the dotted lines 22 in Figure 3, while the other end of this wire is bent at right angles and has a smaller eye 23 formed on the end of the bent portion. The eye 23 is secured to the radius rod by means of a bolt 24 so that the end with the large eye extends outwardly from the one side of the radius rod.

A novel feature of this device consists in the means whereby the brake rod is supported by this bracket. A cup-shaped member 25 is molded with the eye 22 embedded in the rim of the cup member, this member being formed of resilient rubber and having an integral rubber sleeve 26 extending from the bottom of the cup up therethrough beyond the rim portion thereof. The free or normal position of this assembly is shown in Figure 4, from which it will be seen that the rod 19 when inserted through the sleeve 26 will be resiliently supported against radial movement by the cup 25. Thus, rattle between the rod and the supporting wire 21 will be eliminated. The sleeve 26 is of somewhat smaller bore than the diameter of the rod so that the sleeve frictionally grips the rod. It will be noted that when the rod 19 is moved axially to the position shown in Figure 5, the sleeve 26 will be drawn forwardly thereby distorting the material of the cup 25. When the brake applying force is relieved from the rod 19, the cup will return to its original shape thereby resiliently urging the brake rod to its inoperative position. It will, of course, be apparent that the thickness of the material of the cup member 25 will control the resistance offered to axial movement of the brake rod. Further, that the brake rod is only held through the frictional engagement of the sleeve 26 against the rod so that if for any reason the rod 19 is moved beyond the working stroke of the device then the resilient member cannot be torn from the eye 22 but will simply slide along the brake rod.

Among the many advantages arising from the use of my improved device, it may be well to mention that my brake support is especially easy to manufacture as well as being inexpensive; that it should last at least as long as the car; that it requires no lubrication; that rattle between the support and the brake rod is effectively eliminated thereby; and that the device also returns the brake rods to their inoperative positions.

Some changes may be made in the arrangement, construction and combination of the various parts of my improved device without departing from the spirit of my invention, and it is my intention to cover by my claims such changes as may reasonably be included within the scope thereof.

I claim as my invention.

1. In a device of the character described, a comparatively rigid bracket having means associated with one end thereof whereby it may be secured in position on the vehicle chassis, said bracket having an opening formed in the opposite end thereof, and a cup-shaped member of resilient material secured around said opening, said cup-shaped member having means associated with the center portion thereof whereby a brake rod may extend therethrough and be frictionally gripped thereby.

2. In a device of the character described, a comparatively rigid bracket having means associated with one end thereof whereby it may be secured in a fixed position on a vehicle chassis, said bracket having an opening formed in the opposite end thereof, a cup-shaped member of resilient material secured around said opening, and a sleeve formed integrally with the bottom of said cup extending axially therethrough which sleeve is adapted to frictionally grip a brake rod so that both lateral and axial movement of said rod is resisted by the resistance to deformation of said cup member.

3. In a device of the character described, a comparatively rigid bracket having means associated at one end thereof whereby it may be fixedly secured in position on the vehicle chassis, said bracket having an annular opening formed in the free end thereof, and a cup-shaped member of resilient rubber molded around said opening, said cup member having an integral axial sleeve extending therethrough which is adapted to frictionally grip a brake rod, whereby both lateral and axial movement of said rod is resisted by the resistance to deformation of said rubber member.

4. In a device of the character described, a comparatively rigid bracket having means associated with one end thereof whereby it may be fixedly secured on the vehicle chassis, said member having a relatively large eye formed in the free end thereof, a cup-shaped member of resilient rubber molded around said eye, the rim of said cup member having the material of the eye embedded therein, and a sleeve formed integrally with the bottom of said cup member and extending axially therethrough, said sleeve being proportioned so as to frictionally grip a brake rod when the latter is disposed therein, whereby both lateral and axial movement of said rod is resisted by the resistance to deformation of said cup member.

5. In a device of the character described, a comparatively rigid wire bracket having means associated with one end thereof whereby it may be secured in position on the vehicle chassis, the other end of said wire being bent around to form a relatively large eye, a cup-shaped member formed of resilient rubber molded around said eye so that the material of the eye is embedded in the rim of said cup and a resilient rubber sleeve formed integrally with the bottom of said cup and extending axially therethrough, said sleeve being proportioned so as to frictionally grip a brake rod, whereby both lateral and axial movement of said rod is resisted by the resistance to deformation of said cup-shaped member.

6. In a device of the character described, a comparatively rigid wire bracket having one end bent back upon itself to form a small eye whereby it may be fixedly secured to a vehicle chassis, the other end of said wire being bent around to form a comparatively large eye, a cup-shaped member of resilient rubber molded around the relatively large eye, the material of said eye being embedded in the rim of said cup member, and a resilient sleeve formed integrally with the bottom of said cup extending axially therethrough, said sleeve being proportioned so as to frictionally grip a brake rod, whereby both lateral and axial movement of said rod is resisted by the resistance to deformation of said cup.

CHAS. E. WELLMAN.